UNITED STATES PATENT OFFICE.

EDWARD GOODRICH ACHESON, OF NEW YORK, N. Y.

METHOD OF DEFLOCCULATING SOLID SUBSTANCES.

1,345,306. Specification of Letters Patent. Patented June 29, 1920.

No Drawing. Application filed May 1, 1920. Serial No. 378,213.

*To all whom it may concern:*

Be it known that I, EDWARD G. ACHESON, a citizen of the United States, residing at New York, in the county of New York and State of New York, have invented certain new and useful Improvements in Methods of Deflocculating Solid Substances, of which the following is a specification.

This invention relates to methods of deflocculating solid materials, such as graphite, lampblack, clay, amorphous pigments or the like.

It is now well understood in the art that such materials, when rubbed, ground, or subjected to a process of attrition in presence of so-called "deflocculating agents" are ultimately reduced to a state of extreme subdivision, as a result of which a greater or less proportion of the particles become permanently suspensible in water and capable of diffusing therethrough, and may by appropriate treatment be transferred to and suspended in vehicles other than water, for example mineral oils, etc. The deflocculating agents above referred to comprise tannin and tannin-like substances, and other organic bodies or products having similar effects. Certain methods of deflocculating amorphous bodies and utilizing the deflocculated product are disclosed in my prior United States Patents Nos. 722,791; 843,426; 844,989; 875,881; 895,063; 911,358; 931,832; 964,478; 966,636; 986,793; 1,030,372; 1,082,386; 1,201,994; 1,223,350; 1,253,556.

According to the present invention the deflocculating effect is very greatly accelerated by a proper adjustment or control of the moisture content of the charge undergoing deflocculation.

In practice it has been customary to subject the charge to attrition between rollers or otherwise, the charge being in the condition of a heavy paste containing slightly more moisture than is necessary for filling the interstices between the particles. The amount of moisture required to fill the interstitial spaces, or otherwise expressed, the amount of moisture required to produce saturation of the paste, varies somewhat with the material treated; but in the specific case of graphite is approximately 32–33% of the total weight of the paste. When moisture is present in appreciable excess of this proportion the paste is visibly wet upon the exposed surfaces, and in prior practice this condition has been maintained during the deflocculating operation. For example in my prior Patent 1,223,350, the charge is described as being in the form of a stiff paste, containing, in the specific case of graphite, approximately 34 to 38% of total moisture.

I have now discovered that a much more rapid deflocculating effect may be obtained, under otherwise identical conditions, if the total moisture content be kept below the proportion required for saturation of the paste. In the case of graphite the optimum point appears to lie between 20 and 27% of total moisture, although my invention is not restricted to these exact limits.

In this connection it may be explained that the rate of deflocculation is not the sole factor to be considered in practice, since it is customary in this art to re-treat the tailings after the separation of the deflocculated portion of the charge, with the addition of fresh material equivalent to the deflocculated product removed; and in order that fresh deflocculating agent may be added in aqueous solution to these tailings it is of course necessary that their moisture content should be suitably reduced by drying, since otherwise the total moisture content of the paste would tend to increase cumulatively in the course of successive operations. Under these conditions it is apparent that if the moisture content of the charge undergoing deflocculation is maintained at a very low figure, say below 20%, an excessive amount of drying of the tailings may be required to permit the addition of fresh deflocculating agent in aqueous solution without exceeding this figure. Hence I now prefer in practice to maintain a moisture content approximating the upper limit of the operating range above mentioned, that is to say of the order of 24–27% by weight of total moisture for graphite pastes, although excellent results are secured in accordance with this invention whenever the moisture content is maintained below that required for saturation of the paste or to fill the interstices between the particles. The lower limit of moisture will depend somewhat upon the physical characteristics of the material to be deflocculated (graphite, lampblack, clay, etc.), but it may be said in general that the moisture should be sufficient to dissolve the deflocculating agent, and to provide sufficient solution to wet the surfaces of the particles.

By operating with a properly limited moisture content as above described I have been enabled in some cases to treble or quadruple or even further to increase the rate of deflocculation of the charge, with the same raw materials and equipment. I do not limit myself to any theory as to the cause of the effects observed, but it is conveniently assumed that the reduction of the moisture content permits the deflocculating agent to be presented to the graphite in more concentrated solution, without objectionably overloading the charge with deflocculating agent, as would be the case if such more concentrated solutions were employed in larger proportion.

I claim:—

1. Method of deflocculating solid substances, consisting in subjecting said substances, mixed with a deflocculating agent and in paste form, to a process of attrition, the total moisture content of the charge being less than is required to produce saturation of the paste.

2. Method of deflocculating graphite, consisting in subjecting the same, mixed with a deflocculating agent and in paste form, to a process of attrition, the total moisture content of the charge being less than 32% by weight.

3. Method according to claim 2 wherein the moisture content is approximately 24-27%.

In testimony whereof, I affix my signature.

EDWARD GOODRICH ACHESON.